(12) United States Patent
Palmas

(10) Patent No.: US 9,816,036 B2
(45) Date of Patent: Nov. 14, 2017

(54) PROCESS AND APPARATUS FOR FLUID CATALYTIC CRACKING

(71) Applicant: UOP LLC, Des Plaines, IL (US)

(72) Inventor: Paolo Palmas, Des Plaines, IL (US)

(73) Assignee: UOP LLC, Des Plaines, IL (US)

( * ) Notice: Subject to any disclaimer, the term of this patent is extended or adjusted under 35 U.S.C. 154(b) by 612 days.

(21) Appl. No.: 14/465,268

(22) Filed: Aug. 21, 2014

(65) Prior Publication Data

US 2014/0364300 A1    Dec. 11, 2014

Related U.S. Application Data

(63) Continuation of application No. 13/425,657, filed on Mar. 21, 2012, now Pat. No. 8,864,979.

(51) Int. Cl.
| | | |
|---|---|---|
| *C10G 11/18* | (2006.01) | |
| *B01J 29/20* | (2006.01) | |
| *B01J 8/18* | (2006.01) | |
| *B01J 8/26* | (2006.01) | |
| *B01J 8/00* | (2006.01) | |
| *B01J 8/08* | (2006.01) | |
| *B01J 21/20* | (2006.01) | |
| *B01J 29/90* | (2006.01) | |
| *B01J 38/06* | (2006.01) | |
| *C10G 11/00* | (2006.01) | |

(52) U.S. Cl.
CPC ........... *C10G 11/182* (2013.01); *B01J 8/0055* (2013.01); *B01J 8/08* (2013.01); *B01J 8/26* (2013.01); *B01J 21/20* (2013.01); *B01J 29/90* (2013.01); *B01J 38/06* (2013.01); *C10G 11/00* (2013.01)

(58) Field of Classification Search
CPC ... B01J 21/20; B01J 29/90; B01J 38/06; B01J 8/0055; B01J 8/08; B01J 8/26; C10G 11/00; C10G 11/182
See application file for complete search history.

(56) References Cited

U.S. PATENT DOCUMENTS

| | | | | |
|---|---|---|---|---|
| 4,436,613 A | * | 3/1984 | Sayles | C10G 11/182 208/155 |
| 8,864,979 B2 | * | 10/2014 | Palmas | B01J 8/26 208/106 |

* cited by examiner

*Primary Examiner* — Renee Robinson
*Assistant Examiner* — Derek Mueller

(57) ABSTRACT

One exemplary embodiment can be a process for fluid catalytic cracking. The process can include sending a first catalyst from a first riser reactor and a second catalyst from a second riser reactor to a regeneration vessel having a first stage and a second stage. The first catalyst may be sent to the first stage and the second catalyst may be sent to the second stage of the regeneration vessel. Generally, the first stage is positioned above the second stage.

18 Claims, 1 Drawing Sheet

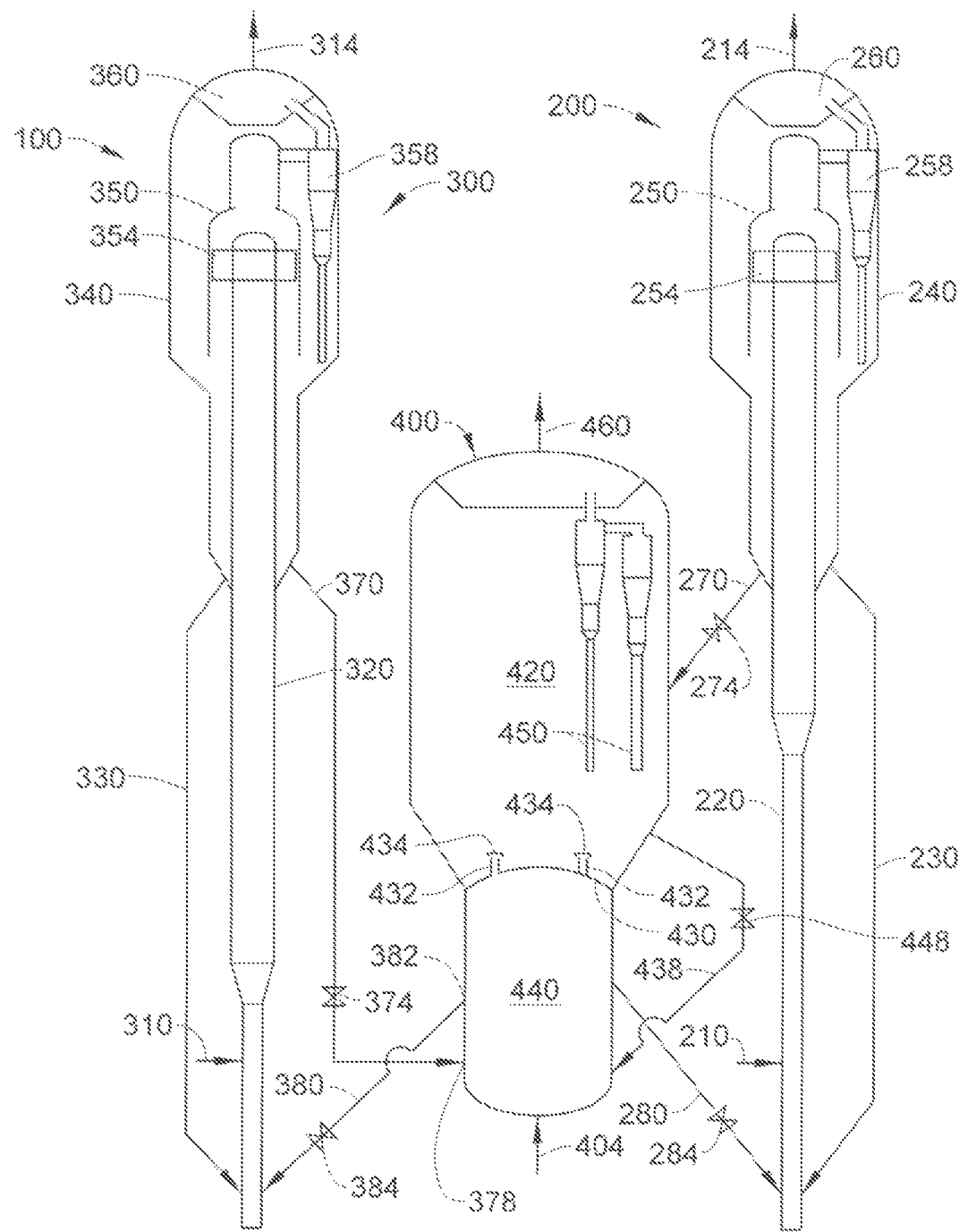

PROCESS AND APPARATUS FOR FLUID CATALYTIC CRACKING

CROSS-REFERENCE TO RELATED APPLICATION

This application is a Continuation of application Ser. No. 13/425,657 filed Mar. 21, 2012, now U.S. Pat. No. 8,864,979, the contents of which are hereby incorporated by reference in its entirety.

FIELD OF THE INVENTION

This invention generally relates to a process and an apparatus for fluid catalytic cracking.

DESCRIPTION OF THE RELATED ART

Catalytic cracking can create a variety of products from larger hydrocarbons. Often, a feed of a heavier hydrocarbon, such as a vacuum gas oil, is provided to a catalytic cracking reactor, such as a fluid catalytic cracking reactor. Various products may be produced from such a system, including a gasoline product and/or light product such as propene and/or ethene.

In such systems, a single reactor or a dual reactor can be utilized. Although additional capital costs may be incurred by using a dual reactor system, one of the reactors can be operated to tailor conditions for maximizing products, such as light alkenes including propene and/or ethene.

In dual reactor systems, valves are often utilized for transferring catalyst to and from the riser reactor and the regenerator. However, the pressure differentials on these valves can vary allowing different rates of wear. This shortcoming can increase maintenance downtimes, particularly due to valves having different wear rates, the unit typically is shutdown to allow replacement of individual valves. Thus, the unit can be shutdown multiple times to replace individual valves. It would be desirable to decrease the standard deviation or variance of the differential pressures across the valves to provide wear consistency across all the valves and reduce maintenance downtimes.

SUMMARY OF THE INVENTION

One exemplary embodiment can be a process for fluid catalytic cracking. The process can include sending a first catalyst from a first riser reactor and a second catalyst from a second riser reactor to a regeneration vessel having a first stage and a second stage. The first catalyst may be sent to the first stage and the second catalyst may be sent to the second stage of the regeneration vessel. Generally, the first stage is positioned above the second stage.

Another exemplary embodiment may be a fluid catalytic cracking apparatus. The fluid catalytic cracking apparatus may have a first riser reactor, a second riser reactor, and a regeneration vessel including a first stage above a second stage. Usually, the first riser reactor communicates spent catalyst to the first stage and the second riser reactor communicates spent catalyst to the second stage.

A further exemplary embodiment may be a process for fluid catalytic cracking. The process can include sending a spent first catalyst through a first line from a first riser reactor to a regeneration vessel and a regenerated first catalyst through a second line from the regeneration vessel to the first riser reactor; and sending a spent second catalyst through a third line from a second riser reactor to the regeneration vessel, and a regenerated second catalyst through a fourth line from the regeneration vessel to the second riser reactor. Generally, the regeneration vessel has a first stage above a second stage with the spent first catalyst being provided to the first stage and the spent second catalyst being provided to the second stage.

The embodiments disclosed herein can reduce pressure variances by moving a spent second catalyst return from the first stage to the lower second stage of a regeneration vessel. As a result of lowering the spent second catalyst return, additional standpipe head can be obtained thus more closely matching the pressure differentials of the other valves of the apparatus.

Definitions

As used herein, the term "stream" can be a stream including various hydrocarbon molecules, such as straight-chain, branched, or cyclic alkanes, alkenes, alkadienes, and alkynes, and optionally other substances, such as gases, e.g., hydrogen, or impurities, such as heavy metals, and sulfur and nitrogen compounds. The stream can also include aromatic and non-aromatic hydrocarbons. Moreover, the hydrocarbon molecules may be abbreviated C1, C2, C3 . . . Cn where "n" represents the number of carbon atoms in the one or more hydrocarbon molecules. Alternatively, a "stream" may include other gases instead of hydrocarbon molecules, such as oxygen and air.

As used herein, the term "zone" can refer to an area including one or more equipment items and/or one or more sub-zones. Equipment items can include one or more reactors or reactor vessels, heaters, exchangers, pipes, pumps, compressors, and controllers. Additionally, an equipment item, such as a reactor, dryer, or vessel, can further include one or more zones or sub-zones.

As used herein, the term "rich" can mean an amount of generally at least about 50%, and preferably about 70%, by mole, of a compound or class of compounds in a stream.

As used herein, the term "substantially" can mean an amount of generally at least about 80%, preferably about 90%, and optimally about 99%, by mole, of a compound or class of compounds in a stream.

As used herein, the term "catalyst" can mean a single catalyst or a mixture of catalysts. Moreover, the terms "first catalyst" and "second catalyst" can mean the same type of catalyst or mixture of catalysts, such as a mixture of a ZSM-5 zeolite and a Y-zeolite. Generally, the terms "first catalyst" and "second catalyst" refer to the location, origination, or destination of the catalyst, e.g., the first riser reactor and the second riser reactor as opposed to type.

As used herein, the term "weight percent" may be abbreviated "wt. %".

As used herein, the term "fluid catalytic cracking" may be abbreviated "FCC".

As used herein, all pressures disclosed herein are absolute and kilopascal maybe abbreviated "kPa".

As used herein, the term "riser reactor" generally means a reactor used in a fluid catalytic cracking process that can include a riser, a reaction vessel, and a stripper. Usually, such a reactor may include providing catalyst at the bottom of a riser that proceeds to a reaction vessel having a mechanism for separating the catalyst from a hydrocarbon.

As depicted, process flow lines in the figures can be referred to interchangeably as, e.g., lines, pipes, feeds, products, or streams.

BRIEF DESCRIPTION OF THE DRAWING

The FIGURE is a schematic depiction of an exemplary fluid catalytic cracking apparatus.

DETAILED DESCRIPTION

Referring to the FIGURE, an exemplary fluid catalytic cracking apparatus 100 can include a first riser reactor 200, a second riser reactor 300, and a regeneration vessel 400. Generally, the first riser reactor 200 can include a first riser 220 terminating in a first reaction vessel 240. The first riser 220 can receive a feed 210 that can have a boiling point range of about 180-about 800° C. Typically, the feed 210 can be at least one of a gas oil, a vacuum gas oil, an atmospheric gas oil, and an atmospheric residue. Alternatively, the feed 210 can be at least one of a heavy cycle oil and a slurry oil. Generally, the feed 210 can be a fresh feed, or receive a recycle stream from, for example, a product separation zone having one or more distillation columns.

Generally, the feed 210 can be provided at any suitable height on the first riser 220, generally above a lift gas provided at the bottom of the first riser 220. The feed 210 may be provided at a distance sufficient to provide a good dispersion of the up-flowing feed and/or catalyst, if desired. Although not depicted, a mixing chamber can also be provided at the bottom of the first riser 220. An exemplary mixing chamber is disclosed in, e.g., U.S. Pat. No. 5,451,313. Catalyst may be recycled to increase the catalyst to oil ratio via a line 230 from the second reaction vessel 240.

The catalyst can be a single catalyst or a mixture of different catalysts. Usually, the catalyst includes two components, namely a first component and a second component. Such a catalyst mixture is disclosed in, e.g., U.S. Pat. No. 7,312,370 and US 2010/0236980.

Generally, the first component may include any of the catalysts that are used in the art of FCC, such as an active amorphous clay-type catalyst and/or a high activity, crystalline molecular sieve. Zeolites may be used as molecular sieves in FCC processes. Preferably, the first component includes a large pore zeolite, such as a Y-type zeolite, an active alumina material, a binder material, including either silica or alumina, and an inert filler such as kaolin.

The second component may include a medium or smaller pore zeolite catalyst, such as an MFI zeolite, as exemplified by at least one of ZSM-5, ZSM-11, ZSM-12, ZSM-23, ZSM-35, ZSM-38, ZSM-48, and other similar materials. Other suitable medium or smaller pore zeolites include ferrierite, and erionite. Preferably, the second component has the medium or smaller pore zeolite dispersed on a matrix including a binder material such as silica or alumina and an inert filler material such as kaolin. The second component may also include some other active material such as Beta zeolite. Preferably, at least one of the first and/or second components is an MFI zeolite having any suitable ratio of silicon to aluminum, such as a silicon to aluminum ratio greater than about 15.

The total mixture in the first riser reactor 200 may contain about 1-about 25 wt. % of the second component, namely a medium to small pore crystalline zeolite with greater than or equal to about 1.75 wt. % of the second component being preferred. The first component may comprise the balance of the catalyst composition.

Generally, the first feed 210 and the first catalyst or catalyst mixture can be provided proximate to the bottom of the first riser 220. Usually, the first feed 210 has a temperature of about 140-about 320° C. Moreover, additional amounts of feed may also be introduced downstream of the initial feed point.

In addition, the first riser reactor 200 can be operated at low hydrocarbon partial pressure in one desired embodiment. Generally, a low hydrocarbon partial pressure can facilitate the production of light alkenes. Accordingly, the first riser 220 pressure can be about 170-about 450 kPa with a hydrocarbon partial pressure of about 35-about 180 kPa, preferably about 70-about 140 kPa. A relatively low partial pressure for hydrocarbon may be achieved by using steam or a dry gas as a diluent to reach equivalent hydrocarbon partial pressures.

The one or more hydrocarbons and catalyst rise to the reaction vessel 240 converting the first feed 210. Usually, the feed 210 reacts within the first riser 220 to form one or more products. The first riser 220 can operate at any suitable temperature, and typically operates at a temperature of about 150-about 580° C., preferably about 520-about 580° C. Exemplary risers are disclosed in, e.g., U.S. Pat. No. 5,154,818 and U.S. Pat. No. 4,090,948.

Subsequently, the catalyst can separate assisted by any suitable device, such as swirl arms 254 contained within a shell 250, and settle to the bottom of the first reaction vessel 240. In addition, the first reaction vessel 240 can include separation devices, such as one or more cyclone separators 258 for further separating out the products from the catalyst particles. Dip legs may drop the catalyst down to the base of the first reaction vessel 240 where openings can permit entry of the spent catalyst into a dense catalyst bed. Exemplary separation devices and swirl arms are disclosed in, e.g., U.S. Pat. No. 7,312,370 B2. The catalyst may pass through the stripping zone where absorbed hydrocarbons can be removed from the surface of this catalyst by counter-current contact with steam. An exemplary stripping zone is disclosed in, e.g., U.S. Pat. No. 7,312,370 B2. Afterwards, the catalyst can be regenerated by passing through a line 270 to the regeneration vessel 400. The regenerated catalyst can return to the riser 220 via a line 280.

The one or more products leaving the disengagement zone can enter a plenum 260 of the reaction vessel 240. Typically, products including propene and gasoline are produced. Afterwards, a product stream 214 can pass from the first reaction vessel 240 for further processing in, e.g., a product separation zone having one or more distillation columns. Such zones are disclosed in, e.g., U.S. Pat. No. 3,470,084. Usually, the product separation zone may produce several products, such as a propene product and a gasoline product.

The second riser reactor 300 including a second riser 320 and a second reaction vessel 340 can receive a feed 310, which can be the same or different as the feed 210. Moreover, a second catalyst or a mixture of catalyst can be used as described above as well. The first catalyst and the second catalyst may be the same or different. Often, the second riser reactor 300 can include a riser 320 terminating in a reaction vessel 340.

In one preferred embodiment, the feed 310 may be one or more C4-C10 alkenes. The feed 310 may at least be partially derived from the product stream 214, usually after further processing by, e.g., fractionation. Typically, the feed 310 can be provided above a lift gas, such as steam and/or a light hydrocarbon, to the second riser 320. Generally, the temperature of the feed 310 can be about 120-about 600° C. when entering the second riser 320. Usually, the temperature of the feed 310 should at least be above the boiling point of the components. Otherwise, the feed 310 can be provided directly to the second riser 320 with the catalyst recirculated to increase the catalyst to oil ratio from the second reaction vessel 340 via a line 330.

The second riser reactor 300 can be operated at a temperature, preferably a temperature of about 560-about 620° C. Usually, a chamber can be provided at the base of the second riser 320 that may receive catalyst. Such a mixing chamber is disclosed in, e.g., U.S. Pat. No. 5,451,313.

Generally, the second reaction vessel 340 can contain a catalyst, preferably a ZSM-5 zeolite, and optionally another catalyst, preferably a Y-zeolite. Desirably, the catalyst in the second reaction vessel 340 is the same type of catalyst in the first reaction vessel 240.

The second riser 320 can operate in any suitable conditions, such as a temperature of about 425-about 705° C., preferably a temperature of about 560-about 620° C., and a pressure of about 170-about 450 kPa, preferably a pressure of about 200-about 250 kPa. Typically, the residence time of the second riser 320 can be less than about 4 seconds, preferably less than about 3.5 seconds. Exemplary risers and/or operating conditions are disclosed in, e.g., US 2008/0035527 A1 and U.S. Pat. No. 7,261,807 B2.

Generally, the feed 310 and the catalyst can rise to the second reaction vessel 340 and the catalyst and the hydrocarbon products can separate using any suitable device, such as swirl arms 354. The product hydrocarbons can rise within a shell 350 and enter a plenum 360. Afterwards the products can exit as a product stream 314, including ethene and/or propene. Catalyst particulates along with some hydrocarbons can enter at least one cyclone separator 358 to further separate the catalyst from the hydrocarbons. The catalyst particles drop to a dense catalyst bed within the second reaction vessel 340.

The second catalyst can be provided directly to the stripping zone and be subjected to stripping the stream and subsequent regeneration, as discussed above. Spent catalyst can be provided via a line 370 to the regeneration vessel 400 and be returned via a line 380.

The regeneration vessel 400 can include a first stage 420 and a second stage 440 separated by a wall or a partition 430. The first stage 420 can include one or more cyclone separators 450, and in this exemplary embodiment can include one set of two-stage cyclone separators 450, although any suitable number may be used. The regeneration vessel 400 may receive an air stream 404 proximate to the second stage 440, which can contain regenerated catalyst. Generally, the second stage 440 operates with an excess of oxygen, and oxygen-depleted gas can pass upward through pipes 432 covered by respective caps 434 to the first stage 420. Additional air can be provided to the first stage 420. The first stage 420 is operated under partial burning conditions with a flue gas stream 460 exiting the top of the regeneration vessel 400. Catalyst can pass from the first stage 420 through an external conduit 438 containing a valve 448 to be received in the second stage 440. Afterwards, the regenerated catalyst can be provided to the first riser 220 by the line 280 and the second riser 320 via the line 380.

The regeneration vessel 400 may be operated at any suitable conditions, such as a temperature of about 600-about 800° C., and a pressure of about 160-about 650 kPa. Other exemplary regeneration vessels are disclosed in, e.g., U.S. Pat. No. 7,312,370 B2 and U.S. Pat. No. 7,247,233 B1.

Referring to the communication of the catalyst to and from the regeneration vessel 400, the line 270 may be referred to as a first line 270, the line 280 may be referred to as a second line 280, the line 370 may be referred to as a third line 370, and the line 380 may be referred to as a fourth line 380. Generally, the first line 270 and the third line 370 communicate with respective stripping zones of, respectively, the first reaction vessel 240 and the second reaction vessel 340 to provide spent catalyst. Usually, the first line 270 provides catalyst to the first stage 420, and the third line 370 provides catalyst to the second stage 440 of the regeneration vessel 400. The second line 280 and fourth line 380 communicate with the second stage 440 to provide catalyst to respective risers 220 and 320 to provide regenerated catalyst. Often, each line 270, 280, 370, and 380 contains respective valves 274, 284, 374, and 384.

Generally, each valve 274, 284, 374, and 384 has a static head creating a pressure differential across the valve. As an example, the valve 274 can have a pressure of about 300-about 350 kPa on the first riser reactor 200 or upstream side, and a pressure of about 250-about 300 kPa on the regeneration vessel 400 or downstream side. Similarly, the valve 284 can have a pressure of about 350-about 400 kPa on the regeneration vessel 400 or upstream side, and a pressure of about 300-about 350 kPa on the first riser reactor 200 or downstream side. Likewise, the valve 374 can have a pressure of about 400-about 450 kPa on the second riser reactor 300 or upstream side, and a pressure of about 300-about 350 kPa on the regeneration vessel 400 or downstream side; and the valve 384 can have a pressure of about 350-about 400 kPa on the regeneration vessel 400 or upstream side, and a pressure of about 250-about 300 kPa on the second reactor riser 300 or downstream side. Typically, the difference in pressure across each valve 274, 284, 374, and 384 as compared to the other valves is minimized, so the standard deviation of the pressure differentials across all four valves is minimized.

Often, an outlet 378 of the line 370 can be proximate to an inlet 382 of the line 380 located at the second stage 440 of the regeneration vessel 400. Although only the outlet 378 and the inlet 382 of, respectively, the lines 370 and 380 are identified, the lines 270, 280, 370, and 380 also have inlets and outlets. Because the second riser reactor 300 produces a minimum amount of coke, it is feasible to reroute the spent catalyst from the first stage 420 to the second stage 440. Typically, the second riser reactor 300 processes lighter feeds requiring less rigorous conditions for producing products. The standard deviation of the pressure differentials across all four valves 274, 284, 374, and 384 is no more than about 20 kPa, or about 10 kPa.

Illustrative Embodiment

The following examples are intended to further illustrate the subject fluid catalytic cracking apparatus. These illustrations of embodiments of the invention are not meant to limit the claims of this invention to the particular details of these examples. These examples are based on engineering calculations and actual operating experience with similar processes.

One exemplary fluid catalytic cracking apparatus can have two riser reactors communicating with a regeneration vessel. Particularly, two lines (collectively containing Valves 1 and 3) can provide catalyst from the respective stripping zones of the riser reactors to the first stage of the regeneration vessel. Two lines (collectively containing Valves 2 and 4) can provide regenerated catalyst from the second stage of the regeneration vessel to the respective risers of the riser reactors. Each line can contain a respective valve. Each riser reactor has a pressure of 239 kPa and the regeneration vessel has a pressure of 281 kPa. Table 1 depicts the pressures across the valves:

TABLE 1

|  | Upstream Pressure (kPa) | Downstream Pressure (kPa) | Difference (kPa) |
| --- | --- | --- | --- |
| Valve 1 | 331 | 283 | 48 |
| Valve 2 | 368 | 314 | 54 |
| Valve 3 | 303 | 283 | 20 |
| Valve 4 | 368 | 285 | 83 |

The sum of the differences for the valves 1-4 is 205 kPa with an average of 51 kPa with a standard deviation of 26 kPa. The standard deviation is calculated by the formula:

$$\sqrt{\frac{\sum (x-\bar{x})^2}{(n-1)}}$$

where: x is an observed value;
$\bar{x}$ is a mean of the observed values; and
n is the number of observed values.

Another exemplary fluid catalytic cracking apparatus can have two riser reactors communicating with a regeneration vessel. Particularly, two lines can provide catalyst from the riser reactors from their respective stripping zones to the first stage and the second stage of the regeneration vessel. Two lines can provide regenerated catalyst from the second stage of the regeneration vessel to the respective risers. Each line can contain a respective valve. This exemplary fluid catalytic cracking apparatus is depicted in the FIGURE. Each riser reactor has a pressure of 239 kPa and the regeneration vessel has a pressure of 281 kPa. Table 2 depicts the pressures across the valves:

TABLE 2

|  | Upstream Pressure (kPa) | Downstream Pressure (kPa) | Difference (kPa) |
| --- | --- | --- | --- |
| Valve 274 | 331 | 283 | 48 |
| Valve 284 | 368 | 314 | 54 |
| Valve 374 | 406 | 330 | 76 |
| Valve 384 | 368 | 285 | 83 |

The sum of the differences for the valves 274, 284, 374, and 384 is 261 kPa with an average of 65 kPa with a standard deviation of 17 kPa. This reduction in the standard deviation of the pressure differentials across all four valves can cause the valves to wear more uniformly. This can be accomplished by increasing the pressure head on the valve 374 in the line 370 by moving the outlet 378 of the line 370 from the first stage 420 to the second stage 440 of the regeneration vessel 400. Thus, the pressure head of the line 370 may be increased by enlarging the length of the pipe above the valve 374. This increase in pressure on the upstream side of the valve 374 can increase the pressure differential across the valve 374 to more closely match the pressure differentials of the other three valves 274, 284, and 384. As such, maintenance may be performed for all four valves during a single shutdown as opposed to having to shut down when individual valves wear out.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing, all temperatures are set forth in degrees Celsius and, all parts and percentages are by weight, unless otherwise indicated.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for fluid catalytic cracking, comprising:
   A) sending a first catalyst from a first riser reactor to a regeneration vessel having a first stage and a second stage, wherein the first stage is positioned above the second stage;
   B) sending a second catalyst from a second riser reactor to the regeneration vessel, wherein the first catalyst is sent to the first stage and the second catalyst is sent to the second stage of the regeneration vessel; and
   C) providing catalyst from said second stage of the regeneration vessel to the first riser reactor and to the second riser reactor.

2. The process according to claim 1, wherein the first riser reactor operates at a pressure of about 170-about 450 kPa.

3. The process according to claim 1, wherein the second riser reactor operates at a pressure of about 170-about 450 kPa.

4. The process according to claim 1, wherein the first and second riser reactors are at about a substantially same pressure.

5. The process according to claim 1, further comprising a first line communicating the first catalyst from the first riser reactor to the regeneration vessel, a second line communicating the first catalyst to the first riser reactor from the regeneration vessel, a third line communicating the second catalyst from the second riser reactor to the regeneration vessel, and a fourth line communicating the second catalyst to the second riser reactor from the regeneration vessel.

6. The process according to claim 5, wherein the first line contains a first valve, the second line contains a second valve, the third line contains a third valve, and the fourth line contains a fourth valve.

7. The process according to claim 6, wherein the standard deviation of the pressure differentials across all four valves is no more than about 20 kPa.

8. The process according to claim 1, wherein the first stage contains one or more cyclone separators.

9. The process according to claim 1, wherein the second stage receives regenerated catalyst prior to returning to the first and second reactor risers.

10. The process according to claim 1, wherein the first riser reactor comprises a first riser and a first reaction vessel, and the second riser reactor comprises a second riser and a second reaction vessel.

11. A fluid catalytic cracking apparatus, comprising:
   A) a first riser reactor;
   B) a second riser reactor;
   C) a regeneration vessel comprising a first stage above a second stage, wherein the first riser reactor communicates spent catalyst to the first stage and the second riser reactor communicates spent catalyst to the second stage; and
   D) the second stage of the regeneration vessel communicates catalyst to the first riser reactor and to the second riser reactor.

12. The apparatus according to claim 11, further comprises a first line communicating spent catalyst from the first riser reactor to the regeneration vessel, a second line communicating regenerated catalyst from the regeneration vessel to the first riser reactor, a third line communicating spent catalyst from the second riser reactor to the regeneration vessel, and a fourth line communicating regenerated catalyst from the regeneration vessel to the second riser reactor.

13. The apparatus according to claim 11, wherein the first stage of the regeneration vessel contains one or more cyclone separators.

14. The apparatus according to claim 12, wherein each of the first, second, third, and fourth lines contains a respective valve.

15. The apparatus according to claim 12, wherein an outlet of the third line is proximate to an inlet of the fourth line.

16. A process for fluid catalytic cracking, comprising:
A) sending a spent first catalyst through a first line from a first riser reactor to a regeneration vessel and a regenerated first catalyst through a second line from the regeneration vessel to the first riser reactor;
B) sending a spent second catalyst through a third line from a second riser reactor to the regeneration vessel, and a regenerated second catalyst through a fourth line from the regeneration vessel to the second riser reactor, wherein the regeneration vessel has a first stage above a second stage with the spent first catalyst being provided to the first stage and the spent second catalyst being provided to the second stage;
C) passing catalyst from said first stage of the regeneration vessel to be received in the second stage of the regeneration vessel; and
D) providing catalyst from said second stage of the regeneration vessel to the first riser reactor and to the second riser reactor.

17. The process according to claim 16, wherein each of the first, second, third, and fourth lines contains a respective first, second, third, and fourth valve.

18. The process according to claim 17, wherein the standard deviation of the pressure differentials across all four valves is less than about 20 kPa.

* * * * *